(12) United States Patent
Sato (10) Patent No.: US 8,573,863 B2
(45) Date of Patent: Nov. 5, 2013

(54) OPTICAL MODULE WITH OPTICAL AXIS BENT PERPENDICULARLY WITHIN PACKAGE

(75) Inventor: Shunsuke Sato, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 161 days.

(21) Appl. No.: 13/046,342

(22) Filed: Mar. 11, 2011

(65) Prior Publication Data

US 2011/0235980 A1    Sep. 29, 2011

(30) Foreign Application Priority Data

Mar. 25, 2010   (JP) ................................. 2010-070253

(51) Int. Cl.
*G02B 6/36* (2006.01)
(52) U.S. Cl.
USPC .................................. 385/93; 385/88; 385/92
(58) Field of Classification Search
USPC ............................................... 385/93, 88, 92
See application file for complete search history.

(56) References Cited

U.S. PATENT DOCUMENTS

| | | | | |
|---|---|---|---|---|
| 6,092,935 A * | 7/2000 | Althaus et al. | ................... | 385/93 |
| 6,188,495 B1 * | 2/2001 | Inoue et al. | ................... | 398/139 |
| 6,948,865 B2 * | 9/2005 | Kuhara | ........................... | 385/93 |
| 7,163,343 B2 * | 1/2007 | Matta et al. | ...................... | 385/88 |
| 7,290,942 B2 * | 11/2007 | Kuhara et al. | ................... | 385/88 |
| 7,476,040 B2 | 1/2009 | Zack et al. | | |
| 2004/0228586 A1 * | 11/2004 | Kuhara | ........................... | 385/92 |
| 2005/0175298 A1 * | 8/2005 | Matta et al. | ..................... | 385/93 |
| 2006/0269197 A1 * | 11/2006 | Uno et al. | ........................ | 385/93 |
| 2010/0183268 A1 * | 7/2010 | Kihara et al. | ................... | 385/93 |
| 2011/0235980 A1 * | 9/2011 | Sato | ................................ | 385/93 |
| 2011/0317965 A1 * | 12/2011 | Fujimura et al. | ................ | 385/93 |

* cited by examiner

*Primary Examiner* — Rhonda Peace
(74) *Attorney, Agent, or Firm* — Venable LLP; Michael A. Sartori; Tamatane J. Aga (57) ABSTRACT

An optical module on the invention provides a multi-layered ceramic package in which the LD, the sub-mount to mount the LD, the optical component to bend the optical axis of the light emitted from the LD toward the lens, and the monitor PD to monitor a portion of the light transmitted through the optical component. These components are mounted on a metal in the package with an adhesive. At least one of the sub-mount and the optical component provides a chamfer in a front bottom corner thereof to provide a room to receive fillets formed in the surfaces facing to and abutting against the other surface.

10 Claims, 14 Drawing Sheets

OPTICAL MODULE WITH OPTICAL AXIS BENT PERPENDICULARLY WITHIN PACKAGE

BACKGROUND OF THE INVENTION

1. Field of the Invention

The present invention relates to a transmitting optical module, in particular, the invention relates to an optical module with a ceramic package.

2. Related Prior Art

The United States patent, U.S. Pat. No. 7,476,040B, has disclosed an optical module with a multi-layered ceramic package installing a sub-mount, a light-transmitting device with a type of, what is called, vertical cavity surface emitting laser diode (VCSEL) mounted on the sub-mount and a lens arranged above the sub-mount and secured by the package. The light emitted from the surface of the VCSEL is directly coupled with the optical fiber, which is also arranged above the package, though the lens.

The optical module like those disclosed in the prior art above sometimes installs a semiconductor laser diode (hereafter denoted as LD) of the edge-emitting type. In such an optical module, the light emitted from the LD is necessary to be reflected by an optical component such as mirror and prism to couple the light with the optical fiber arranged above the package. The optical coupling efficient between the LD and the optical fiber in such a module with a bent optical axis therebetween depends on the optical design, in particular, a distance between the LD and the lens strongly influences on the optical coupling efficiency.

Various factors affects the optical coupling efficiency between the LD and the optical fiber; for instance, (1) positional accuracy between the LD and the sub-mount, (2) a distance between the sub-mount and the optical component to reflect light, (3) a distance between the light-reflecting surface of the optical component and the lens, and so on. The first factor above listed may be overcome by the assembling process using a device-mounting apparatus. Specifically, the apparatus may position the LD relative to the sub-mount which is fixed with respect to the apparatus by carrying the LD after abutting it to the reference plane of the apparatus; while, the forming accuracy of the optical component, that of the housing of the module, and that of the lens solely influence the positional tolerance between the lens and the optical component.

However, the positional accuracy between the sub-mount and the optical component, which is listed as the second factor above, is necessary to assemble the optical component relative to the sub-mount, on which the LD is mounted, with a designed distance therebetween. This process requires an advanced apparatus that provides an image recognition system to align the position of the element, such as the LD, the optical component and the sub-mount.

SUMMARY OF THE INVENTION

One aspect of the present invention relates to an optical module that comprises a semiconductor optical device, a sub-mount configured to mount the semiconductor optical device, an optical component configured to include a light-reflecting surface, and a package that installs the sub-mount and the optical component on the primary surface thereof. The light-reflecting surface may bend the optical axis of the semiconductor optical device, which extends substantially in parallel to the primary surface of the package, toward a direction perpendicular to the primary surface. A feature of the optical module of the present invention is that the sub-mount provides a front surface that faces the optical component and comes in contact with the side surface of the optical component. Thus, a distance between the semiconductor optical device on the sub-mount and the light-reflecting surface may be automatically determined in a designed distance.

Another aspect of the present invention relates to a method to assemble the optical module. The method may first handle the sub-mount with a vacuum collet, abut it against a reference wall of an apparatus that provides the vacuum collet, and place it in a predetermined position on the primary surface of the package, where the predetermined position is defined with respect to the reference wall of the apparatus. Second, the method may handle the semiconductor optical device with the vacuum collet, abut it against the reference wall, and place it in a designed position on the sub-mount. Third, the method may place the optical component on the primary surface of the package such that the side surface of the optical component comes in contact with the front surface of the sub-mount.

In a modification, the method of the present invention may first set the optical component in the predetermined position on the primary surface of the package. Next, the method may place the sub-mount on the primary surface of the package such that the front surface of the sub-mount comes in contact with the side surface of the optical component. Finally, the process may handle the semiconductor optical device by the vacuum collet, abut the semiconductor optical device against the reference wall, and place the semiconductor optical device in the predetermined position on the sub-mount.

BRIEF DESCRIPTION OF DRAWINGS

The invention may be more completely understood in consideration of the following detailed description of various embodiments of the invention in connection with the accompanying drawings, in which.

DETAILED DESCRIPTION OF PREFERRED EMBODIMENTS

Next, some preferred embodiments will be described as referring to accompany drawings. In the description of the drawings, the same numerals or the symbols will refer to the same elements without overlapping explanations.

Figure 1:
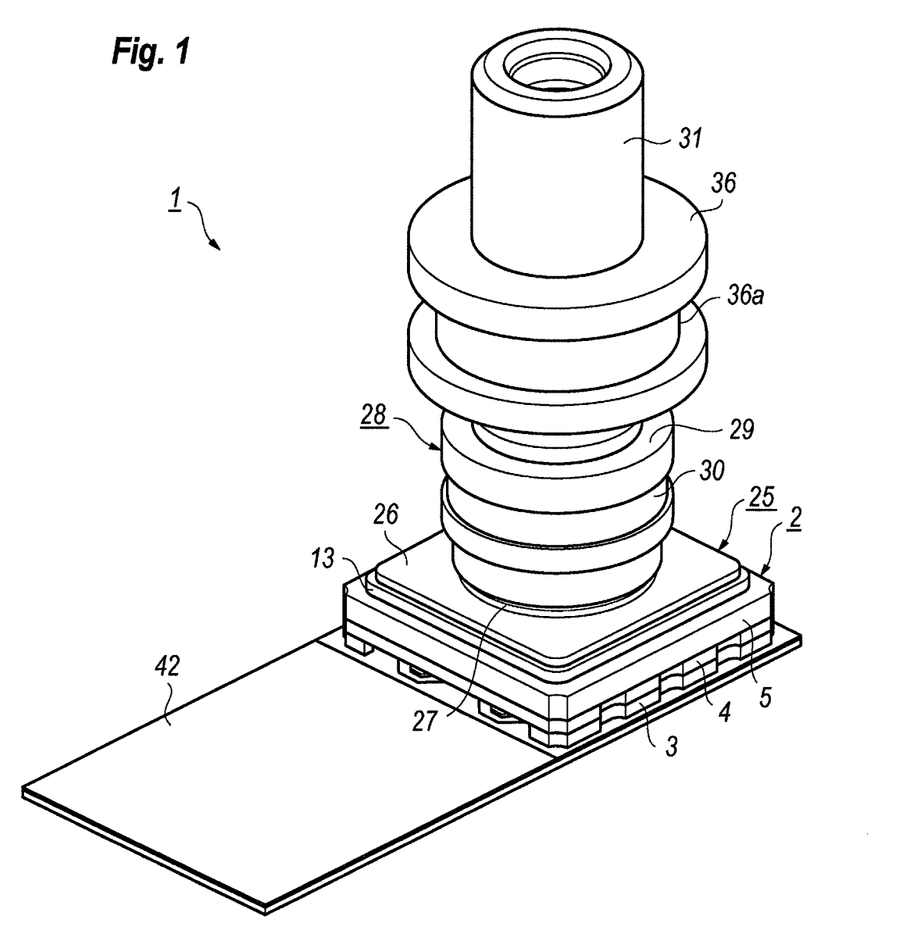
FIG. 1 is a perspective view of the optical module according an embodiment of the present invention.
Figure 2:
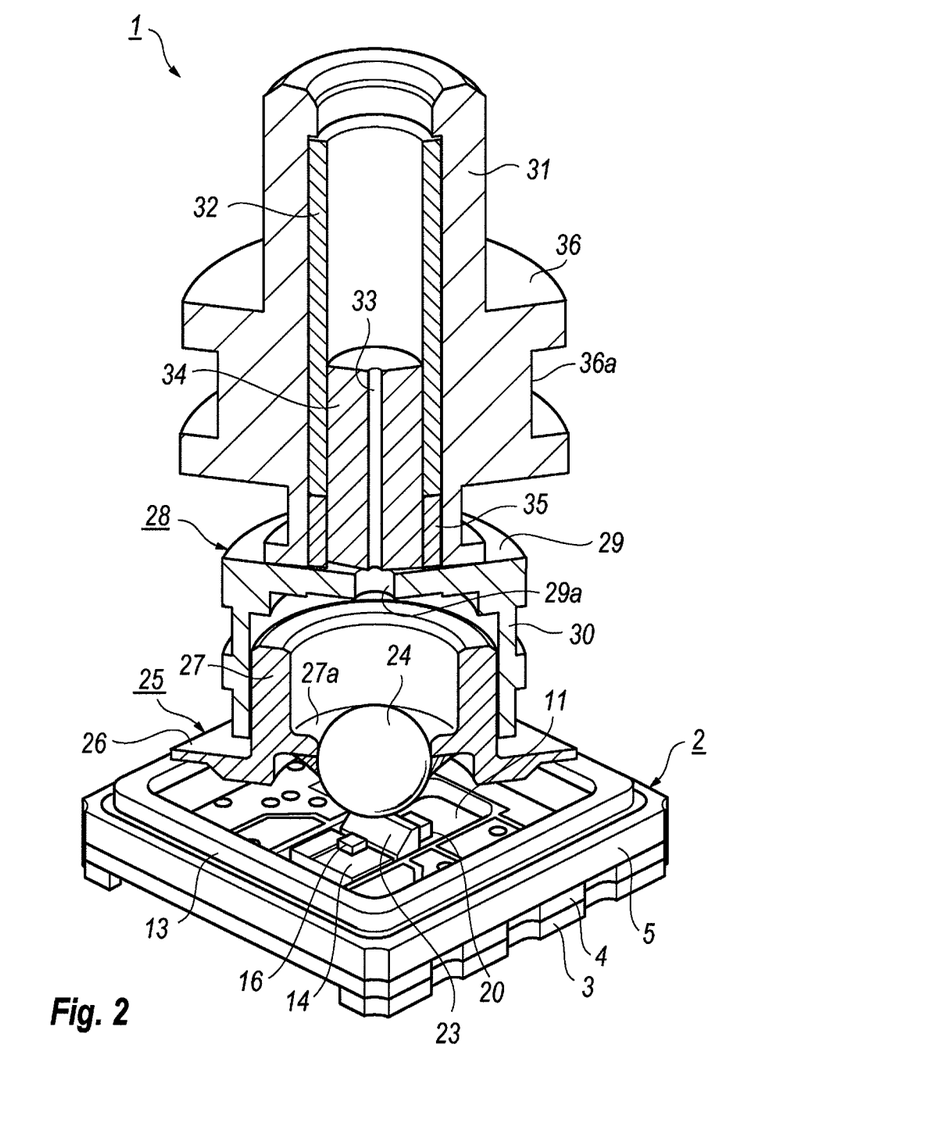
FIG. 2 is a perspective view of the optical module which partially includes a cross section of the optical module.
Figure 3:
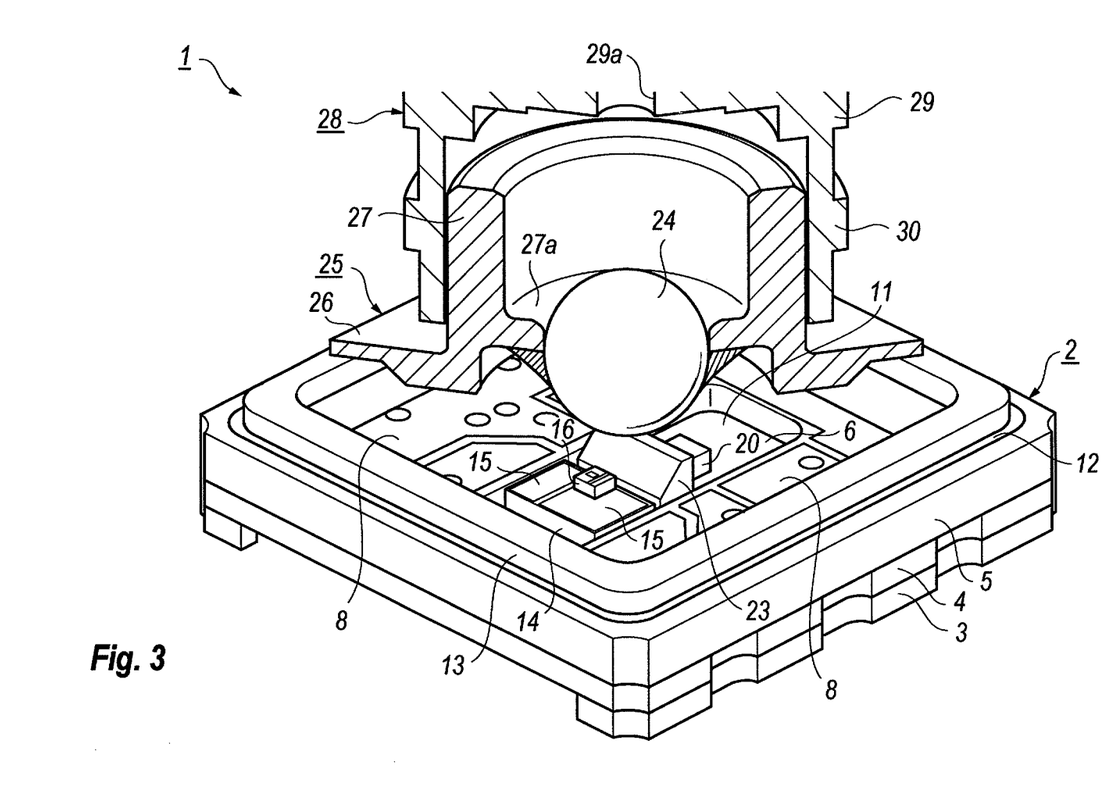
FIG. 3 magnifies a primary portion of the optical module.

FIG. 1 is a perspective view of the optical module according to an embodiment of the present invention; FIG. 2 is also a perspective view, which is partially broken to show an inside of the module; and FIG. 3 magnifies a primary potion of the optical module shown in FIG. 2. As shown in FIGS. 1 to 3, the optical module 1 of the present embodiment provides a tri-layered ceramic package 2 including a lower ceramic layer 3, an intermediate ceramic layer 4, and a upper ceramic layer 5, all of which are made of alumina because of the workability thereof.

The lower ceramic layer 3 has a rectangular with metal layers 6, which a not shown in FIGS. 1 to 3, on both the bottom and the top layers thereof, and a plurality of metal plugs 7 electrically connecting both metal layers 6 is provided so as to pass the lower ceramic layer 3. A plurality of electrodes is formed on the bottom surface of the lower ceramic layer 3 to make electrical connections with external circuits.

Figure 4:
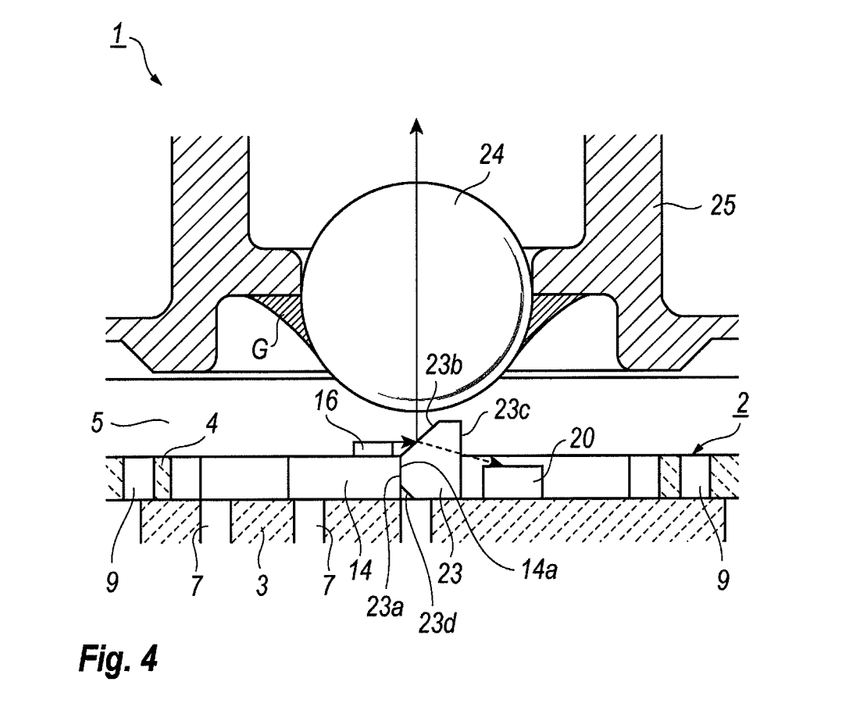
FIG. 4 is a cross section of the optical module, which shows an optical coupling relation between components installed in the optical module.

The intermediate ceramic layer 4 also has a rectangular shape and metal layers 8 on both the top and bottom surfaces thereof. As shown in FIG. 4, the intermediate ceramic layer 4 also provides a plurality of metal plugs 9 electrically connecting both metal layers 8. An opening 10 is formed in a center portion of the intermediate ceramic layer 4. The opening 10 may form, accompanied with the top surface of the lower ceramic layer 3, a cavity 11 into which an optical device is installed.

The upper ceramic layer 5 has a rectangular ring shape to provide a cavity continuous to the aforementioned cavity 11 formed by the intermediate ceramic layer 4 and the lower ceramic layer 3. Thus, the upper ceramic layer 5 provides side walls for the cavity. Metal layers are formed on both the top and bottom surfaces of the upper ceramic layer 5; but no metal plugs are provided in the upper ceramic layer 5. Accordingly, the metal layer 12 on the top surface thereof may be electrically isolated from the metal layer on the bottom surface. The metal layer 12 on the top surface provides a metal ring 13 thereon by, for instance, brazing.

The bottom of the cavity 11, which is the top surface of the bottom ceramic layer 3, mounts a sub-mount 14 with a substantially rectangular shape and made of material with thermal conductivity higher than that of the alumina for the tri-ceramic layers, 3 to 5. The sub-mount may be typically made of aluminum nitride. The sub-mount 14 forms a metal layer 15 on the top surface thereof, and the LD 16 is mounted on the metal layer 15. In the present embodiment, the LD is a type of, what is called, the edge-emitting LD that emits light to a direction along the top surface of the intermediate ceramic layer 4.

Figure 5:
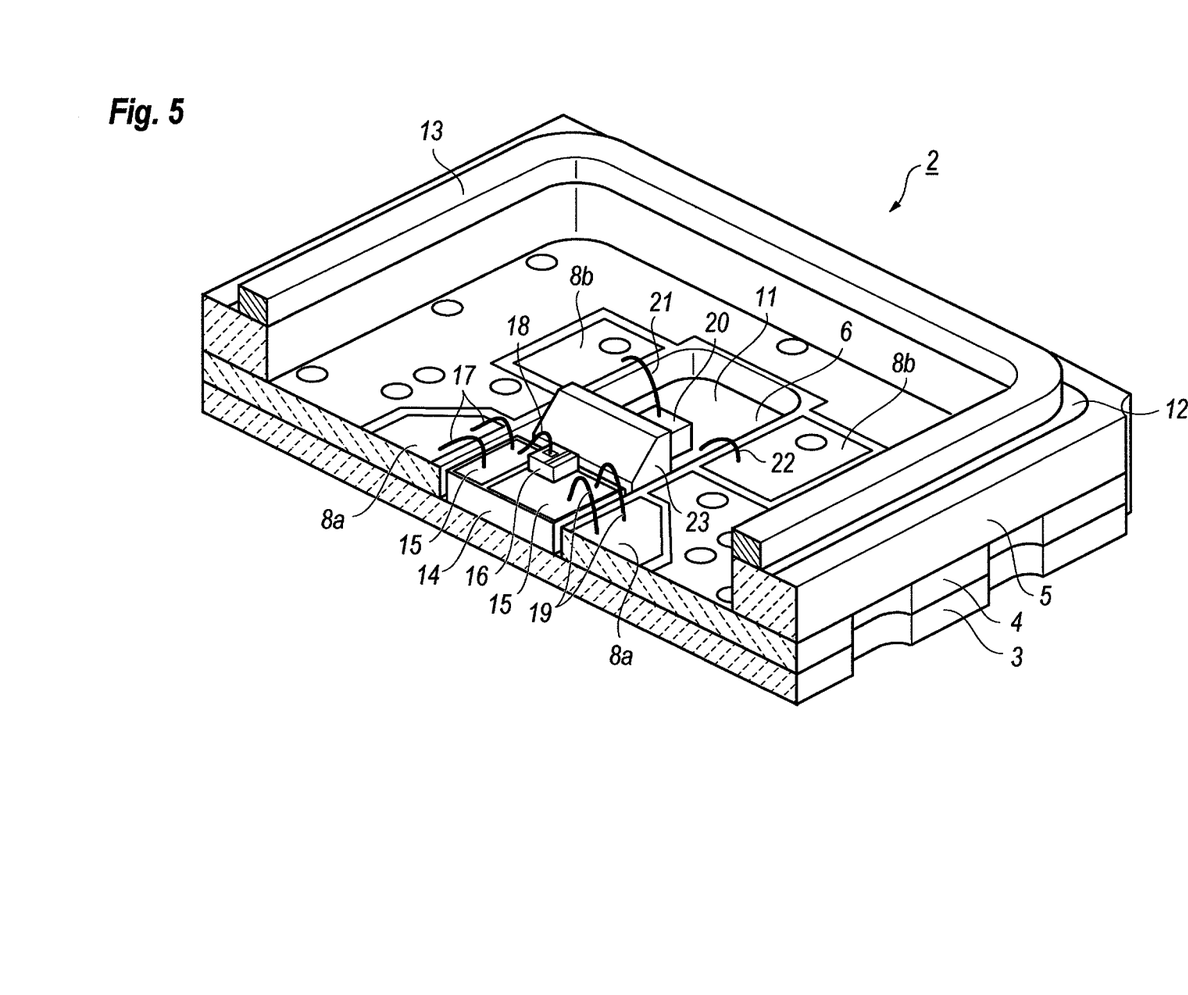
FIG. 5 is a magnified perspective view of the multi-layered ceramic package, a portion of which is cut to show a cross section thereof.

Two of metal layers 8a formed on the top surface of the intermediate ceramic layer 4, which put the sub-mount 14 therebetween, are for the interconnections for the LD 16 to transmit driving signals with high frequency components. These two metal layers 8a are electrically connected with the metal electrodes on the bottom surface of the lower ceramic layer 3 through metal plugs, 9 and 7, as shown in FIG. 4. Bonding wires 17 may connect the metal layers 8a on the top surface of the intermediate ceramic layer 4 with the metal layer 15 on the top of the sub-mount 14; while, another bonding wire 18 may connect the LD 16 with the metal layer 15 on the top of the sub-mount 14. Another metal layer 8a on the top of the intermediate ceramic layer 4 is connected with the ground metal layer 15 on the top of the sub-mount 14 by a bonding wire 19, as shown in FIG. 5.

The bottom of the cavity 11 mounts a monitor photodiode (hereafter denoted as mPD) 20, which detects the magnitude of the light emitted from the LD 16. Two metal layers 8b which put the mPD 20 therebetween among metal layers on the top of the intermediate ceramic layer 4 may be connected to the mPD 20. A bonding wire 21 connects one of the metal layers 8b with the top of the mPD 20 to get a photocurrent from the mPD, while, another bonding wire 22 connects the other metal layer 8b on the top of the intermediate ceramic layer 4 with the metal layer 6 on the top of the lower ceramic layer 3, which is the bottom of the cavity 11, to secure the ground for the mPD 20.

An optical component 23, which is typically a prism or a mirror, is arranged between the sub-mount 14 and the mPD 20 in the cavity 11 such that the front surface 14a of the sub-mount 14 facing the optical component 23 comes in contact the side 23 of the optical component 23 as shown in FIG. 4. The optical component 23 provides a reflecting surface 23b and an emitting surface 23c. The reflecting surface 23b reflects a portion of the light coming from the LD 16 upward and transmits a rest portion of the light, while the emitting surface 23c transmits the rest portion of the light toward the mPD 20. The reflecting surface 23b slopes by substantially 45° to the top of the intermediate ceramic layer 4 and has a designed reflectivity.

The optical component 23 and the sub-mount 24 are assembled by soldering, an adhesive with electrically conductive or insulating, and so on; while, the LD 16 and the mPD 20 are assembled by soldering or electrically conductive adhesive. The corner of the optical component 23 between the side surface 23a facing the sub-mount 14 and the bottom thereof may be chamfered 23d to secure a room to receive a surplus solder or adhesive oozed out from the bottom thereof.

The intermediate ceramic layer 4 may mount electronic components such as ICs, resistors, capacitors and so on, on the top surface thereof with a solder or an adhesive, which are not illustrated in figures. Bonding wires or another means, for instance, the flip-chip technique may electrically connect those electronic components with the metal layers 8 on the intermediate ceramic layer 4.

The tri-layer ceramic package 2 thus configured may fix the holder 25 on the top thereof to hold the optical lens 24. The lens 24 may be fixed to the holder 25 with, for instance, a seal glass G with a low melting point. The cavity of the package 2, which is surrounded by the lower ceramic layer 3, the upper and intermediate ceramic layers, and the holder, may be airtightly sealed by welding the holder 25 on the metal ring 13 under dry-nitrogen atmosphere.

Specifically, the holder 25 includes a ceiling 26 which is welded with the metal ring 13 and covers the cavity of the package, and a cylinder 27 continuous to the ceiling 26. An axis of the cylinder 27 makes a right angle with respect to the upper and lower surfaces of the package 2. The lens 24 is fixed to the inner flange 27a extended inwardly in the cylinder 27. The holder 25 may be assembled with the metal ring 13 so as to minimize the misalignment of the axis of the lens 24 with that of the LD 16.

The holder 25 is assembled with a joint sleeve 28 with the YAG laser welding. The joint sleeve 28 includes a ceiling 29, which provides an opening to pass the light therethrough, and a cylinder 30 extending from the ceiling 29 toward the holder 25. The cylinder 30 receives and is fixed to the cylinder 27 of the holder 25.

The joint sleeve 28 fixes the sleeve cover 31 on the ceiling 29 thereof by the YAG laser welding. The metal cover 31 secures the sleeve 32 made of ceramics, such as zirconia. The zirconia sleeve 32 holds a stub 34 providing a coupling fiber 33 in a center thereof in a root portion close to the joint sleeve 28. The sleeve cover 31 also secures a plug 35 in the root portion continuous to the zirconia sleeve 32. The plug 35 is press fitted between the sleeve cover 31 and the stub 34. The plug 35 may securely hold the stub 33 in the root portion of the sleeve cover 31. The sleeve cover 31 provides in an outer periphery thereof two flanges 36 and a necked portion between the flanges 36. The sleeve cover 31 assembled with the zirconia sleeve 32, the stub 34 and the plug 35 may be aligned with the ceiling 29 of the joint sleeve 29 in a plane perpendicular to the optical axis of the coupling fiber 34 such that the light emitted from the LD 16 couples in the coupling fiber 33; while, the joint sleeve 28 may be aligned with the holder 25 along the optical axis by sliding the cylinder 30 on the other cylinder 27 of the holder 25. Thus, the three axes alignment may be performed.

In the optical module 1, the light emitted from the LD 16 may couple with coupling fiber 33 in the stub 34 reflected upward by the reflecting surface 23b of the optical component 23 and focused by the lens 24. A portion of the light transmits the reflecting surface 23b and couples with the mPD 20, as shown in FIG. 4.

Figure 6:
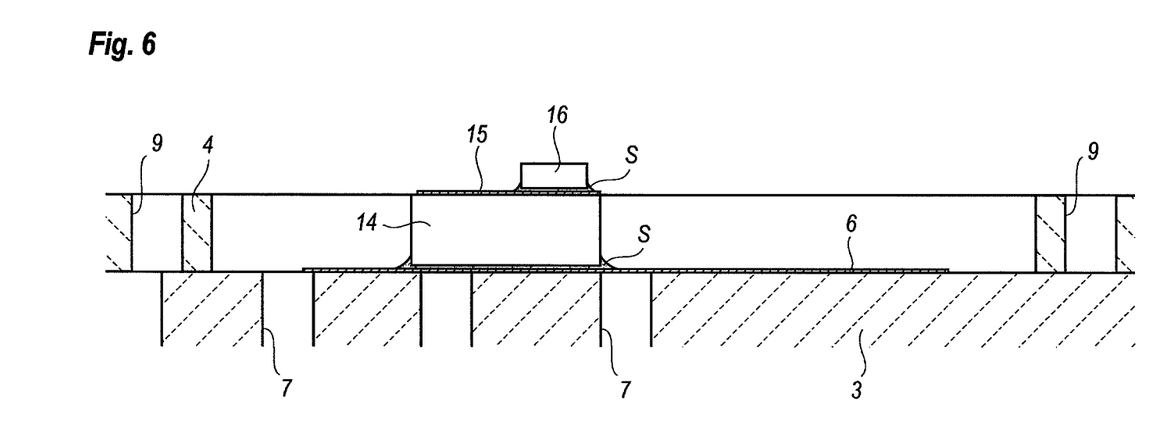
FIG. 6 is a side cross section in the package, in which the LD and the sub-mount are assembled therein.

Next, a manufacturing process of the optical module 1 will be described. First, the sub-mount 14 is placed on the metal layer 6 on the top of the lower ceramic layer 3 by an adhesive S; and the LD 16 is also placed on the sub-mount 16 by another adhesive S, where two adhesives S may be an electrical conductive resin or a metal solder containing primarily gold (Au). In the latter assembly of the LD 16, the position of the LD 16 with respect to the sub-mount 14 may be so adjusted that, when the optical component 23 is placed, the LD 16 has a designed distance to the reflecting surface 23b of the optical component 23 (FIG. 6).

Because the process described above mounts the sub-mount 14 on the metal layer 6 and the LD 16 on the sub-mount 14 and the fixing of the sub-mount 14 and the LD 16 is carried out in the same time; the position of the sub-mount 14 and that of the LD 16 relative to each other may be easily controlled. The fixing of elements may be preformed by heating the adhesive S at the same time.

More specifically, the sub-mount 14, which is handled by a vacuum collet, is abut against a reference wall of the apparatus providing the vacuum collet to set the reference position, then it is moved to the predetermined position in the package; where the package is set in the position of the apparatus in advance to handle the sub-mount. Next, the LD 16, which is also handled by the vacuum collet, is abut in a portion of the end facet thereof not affecting the optical performance against the reference wall of the apparatus, then moved to the designed position on the sub-mount 14. Thus, the apparatus may enhance the accuracy of not only the relative position between the sub-mount 14 and the LD 16 but the position of the sub-mount 14 to the ceramic package 2.

In a modification, the optical component 23 may be first handled by the vacuum collet to set it in a designed position within the package 2, where the package 2 is positioned with respect to the apparatus providing the vacuum collet in advance. In this process, the optical component is butted against the reference wall of the apparatus; then it is set in the designed position in the package. Second, the sub-mount 14 is set such that the front surface 14a thereof comes in contact with the side surface 23a of the optical component. Finally, the LD 16 is handled by the vacuum collet to abut against the reference wall of the apparatus, then, the collet places the LD 16 in a predetermined position on the sub-mount 14. Accordingly, the relative position between the LD 16 and the light-reflecting surface 23b, or equivalently between the LD 16 and the lens 24, may be adequately determined.

The adhesive S is put between the sub-mount 14 and the metal layer 6, and also covers sides of the sub-mount 14, which causes, what is called, fillets in the side of the sub-mount 14. Another adhesive for the LD 16 may also cause fillets in the sides of the LD 16. When the adhesive is the conductive resin, the adhesive is effectively prohibited to be spread on the metal layer 6 but an excess portion thereof easily causes fillets in the side of the material; while, a solder is used for the adhesive, it easily spreads on the metal layer 6 without causing the fillet.

Figure 7:
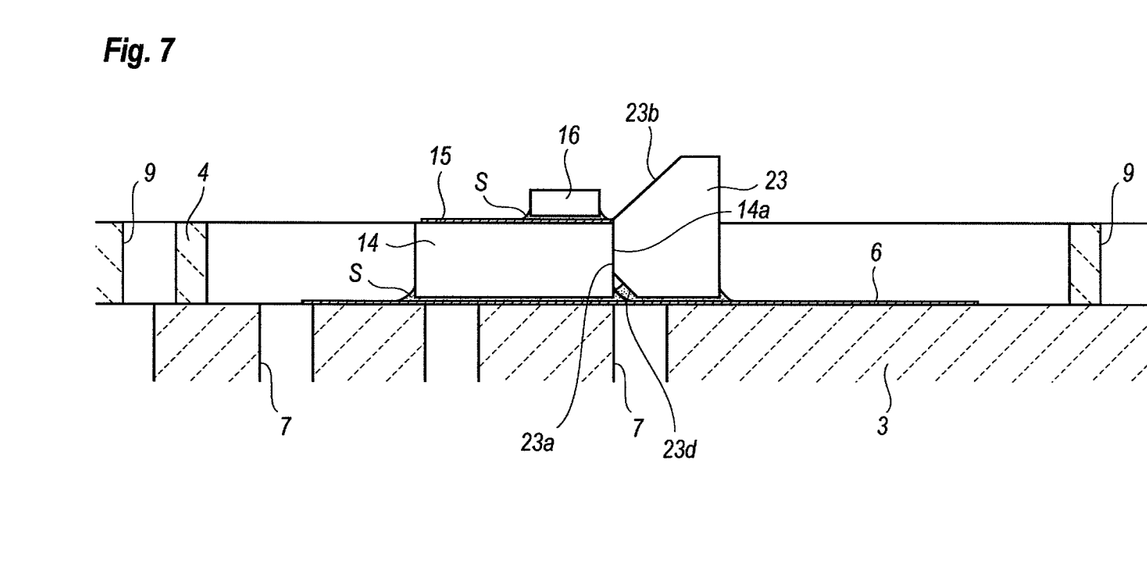
FIG. 7 is a side cross section in the package, in which the optical component is further assembled therein.

Next, the process mounts the optical component 23 on the metal layer 6 by an adhesive S such that the side surface 23a continuous to the reflective surface 23b abuts against the front surface 14a of the sub-mount 14, as shown in FIG. 7. Because the optical component 23 provides the chamfer 23d, a surplus adhesive S oozed out from the bottom thereof may be left in a room formed by the chamfer 23d and prevented from being put between the surfaces, 14a and 23a. Accordingly, the LD 16 may secure the position relative to the reflective surface 23b of the optical component 23 by abutting the front surface 14a of the sub-mount 14 against the side surface 23a of the optical component 23.

Figure 8:
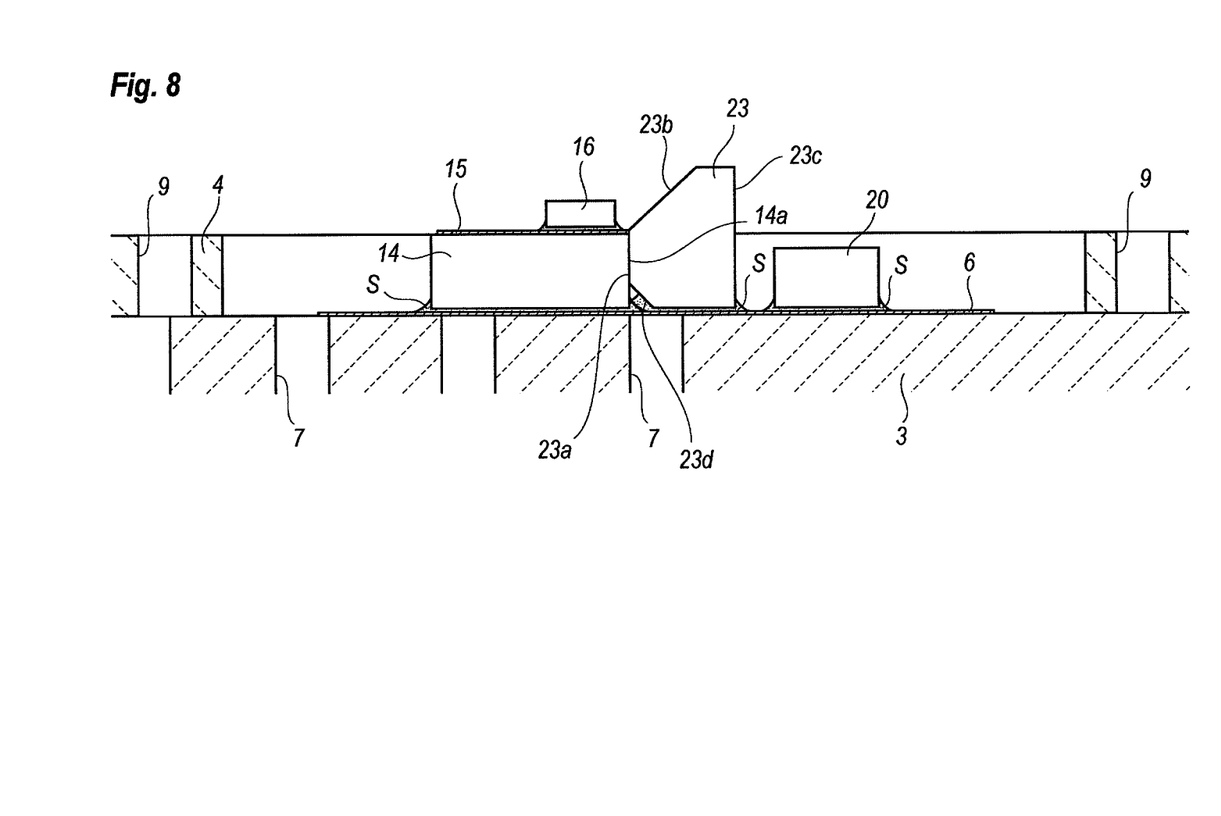
FIG. 8 is a side cross section in the package, in which the monitor PD is further assembled therein.

The process subsequently mounts the mPD 20 by an adhesive S on the metal layer 6 in a position opposite to the sub-mount 14 with respect to the optical component 23, as shown in FIG. 8. Because the light emitted from the LD 16 and passing through the optical component 23 is a diffused light; the position of the mPD 20 is insensitive to position of the sub-mount 14, or equivalently to the LD 16. Even the adhesive S for the optical component 23 causes fillets in the side 23c thereof; the mPD 20 may be mounted on a position apart from the optical component 20.

Figure 9:
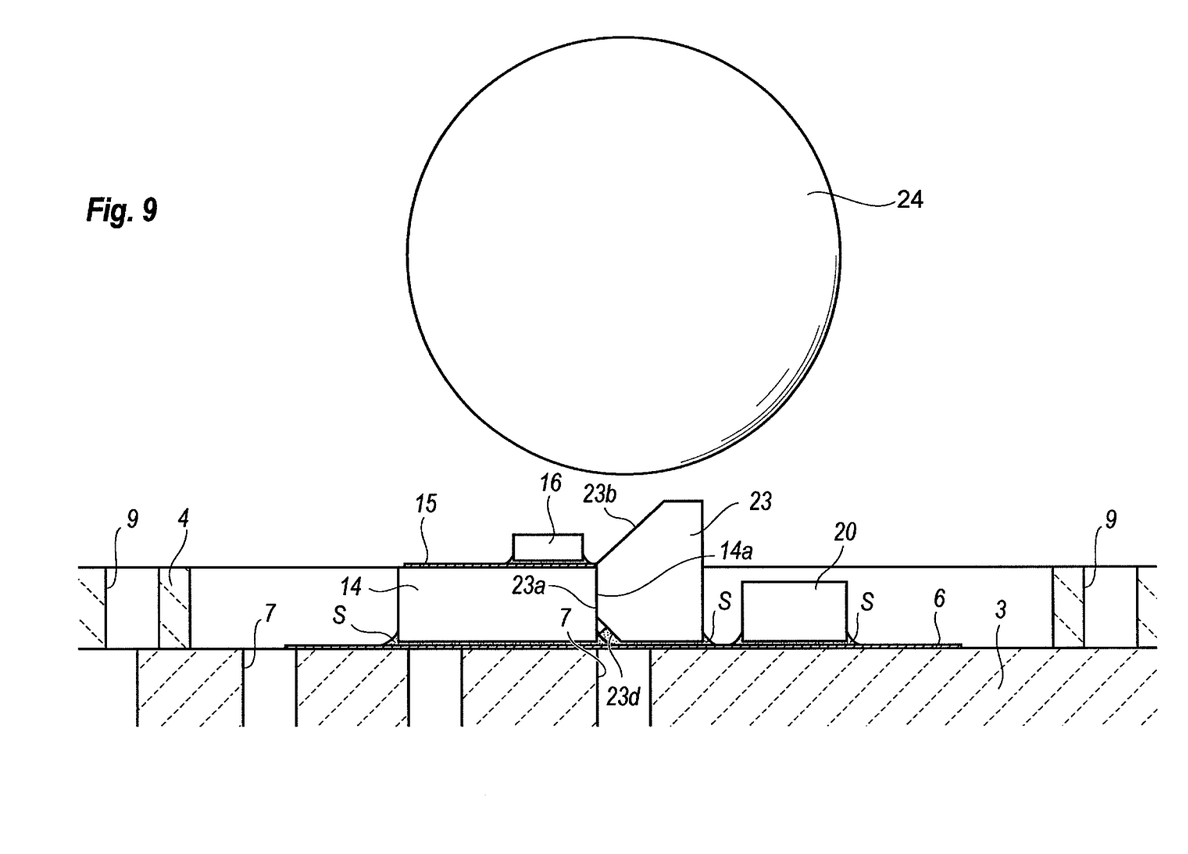
FIG. 9 is a side cross section in the package, in which the lens is further assembled therein.

Mounting electronic components of the top of, the intermediate ceramic layer 4, and wiring those components and optical devices, the holder 25 is fixed on the metal ring 13 as aligning the lens 24 with respect to the LD 16, as shown in FIG. 9.

Figure 10:
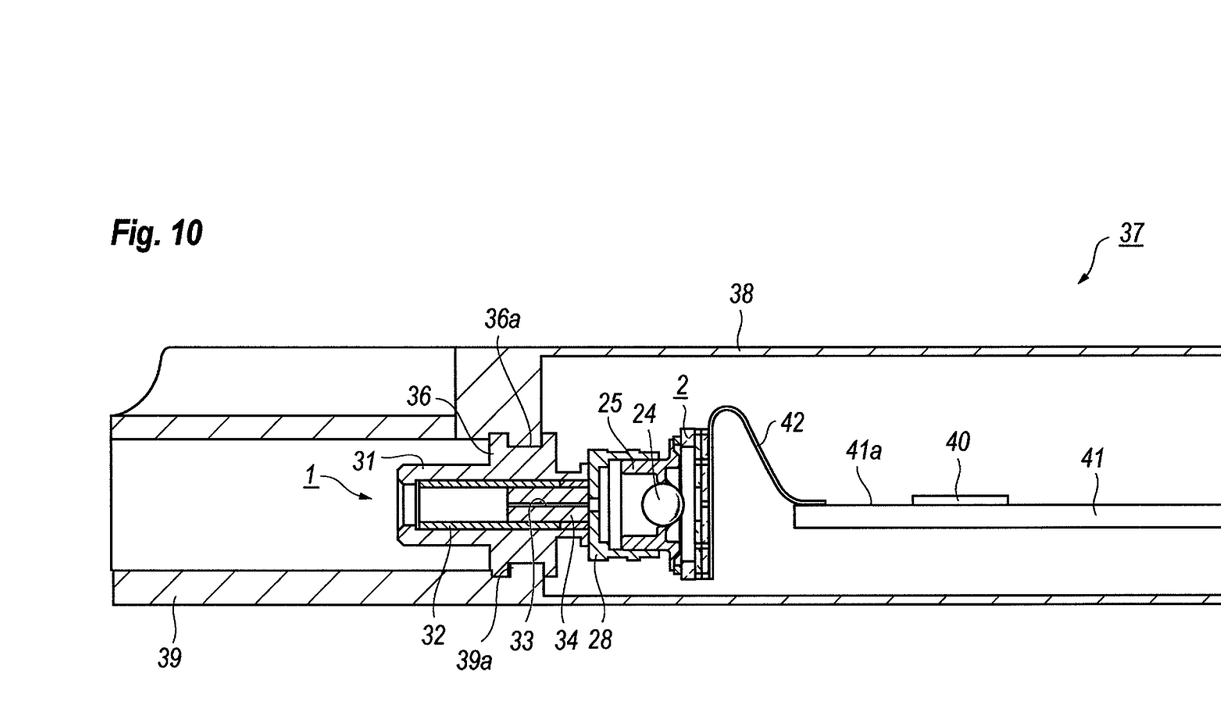
FIG. 10 is a cross section of an optical transceiver that installs the optical module shown in FIG. 1.

The optical module 1 thus assembled is installed within the optical transceiver 37 as shown in FIG. 10. The optical transceiver 37 provides a housing 38 with an optical receptacle 39 in the front end thereof. The optical receptacle 39 may guide an optical connector, which is not illustrated in figures, to be couple with the optical module 1. The optical receptacle 39 provides a projection 39a in the rear end thereof, which mates with the necked portion 36a between the outer flanges 36 of the sleeve cover 31 and positions the optical module 1 in the optical transceiver 37.

The optical transceiver 37 further includes a circuit board 41 that mounts an electronic circuit communicating with the optical module 1. The circuit board 41 is arranged in the housing 38 such that the primary surface 41a thereof is perpendicular to the bottom of the ceramic package 2. A flexible printed circuit (hereafter denoted as FPC) 42 electrically connects the optical module 1 with the electronic circuit on the circuit board 41.

Figure 11:
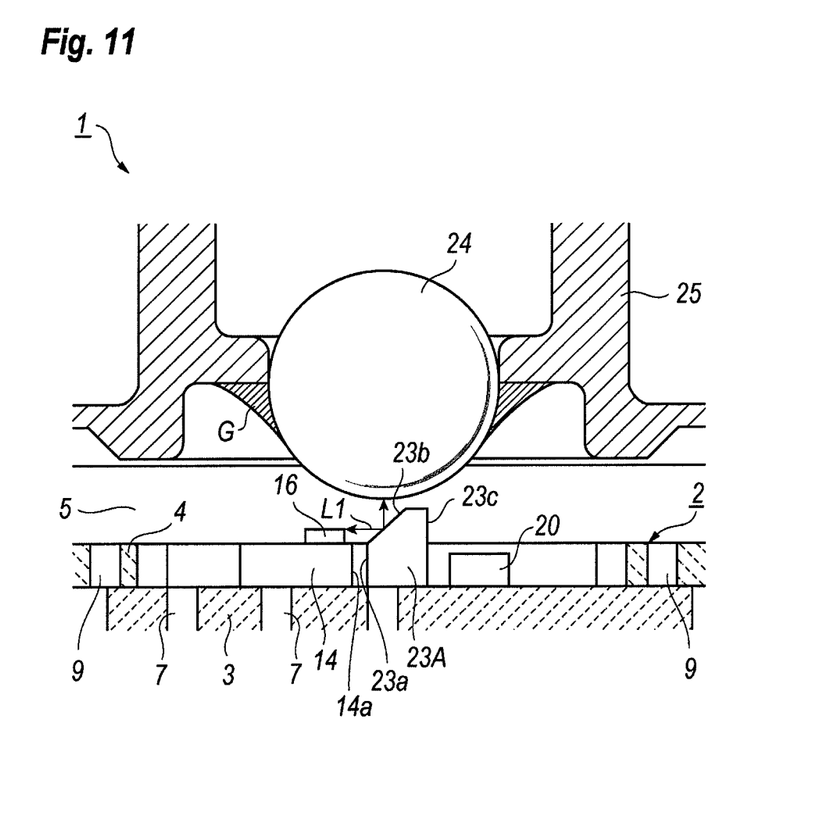
FIG. 11 is a side cross section of a conventional optical module.

FIG. 11 compares a conventional arrangement of components in the optical module with the present invention. The conventional optical component 23A does not provide any chamfer 23d between the side surface 23a and the bottom thereof. Accordingly, a room is necessary between the surfaces of the sub-mount 14 and the optical component 23A to receive a surplus adhesive.

Figure 12:
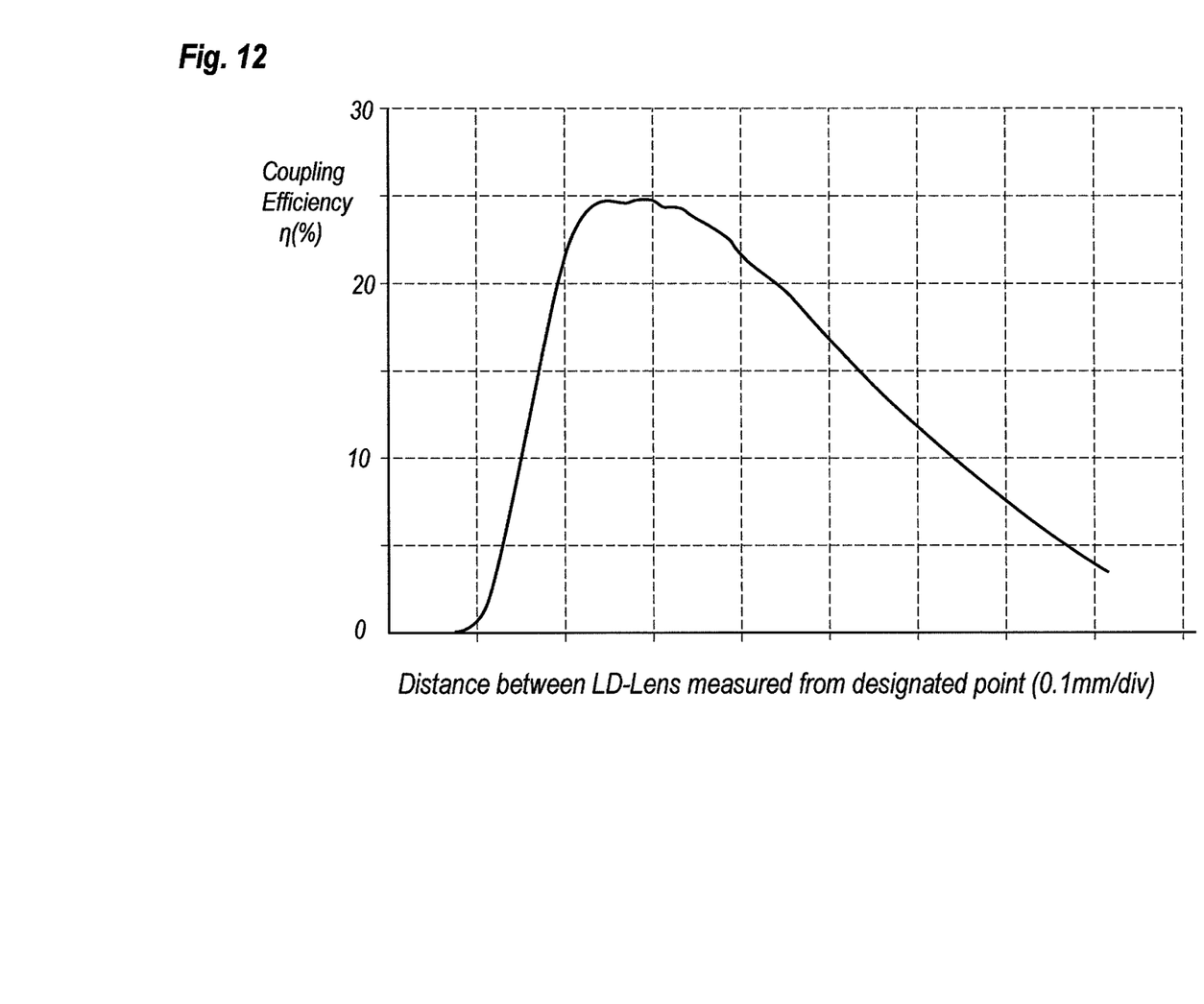
FIG. 12 shows a relation between a distance from the light-emitting facet of the LD to the lens and the optical coupling efficiency η between the LD and the optical fiber.
Figure 13:
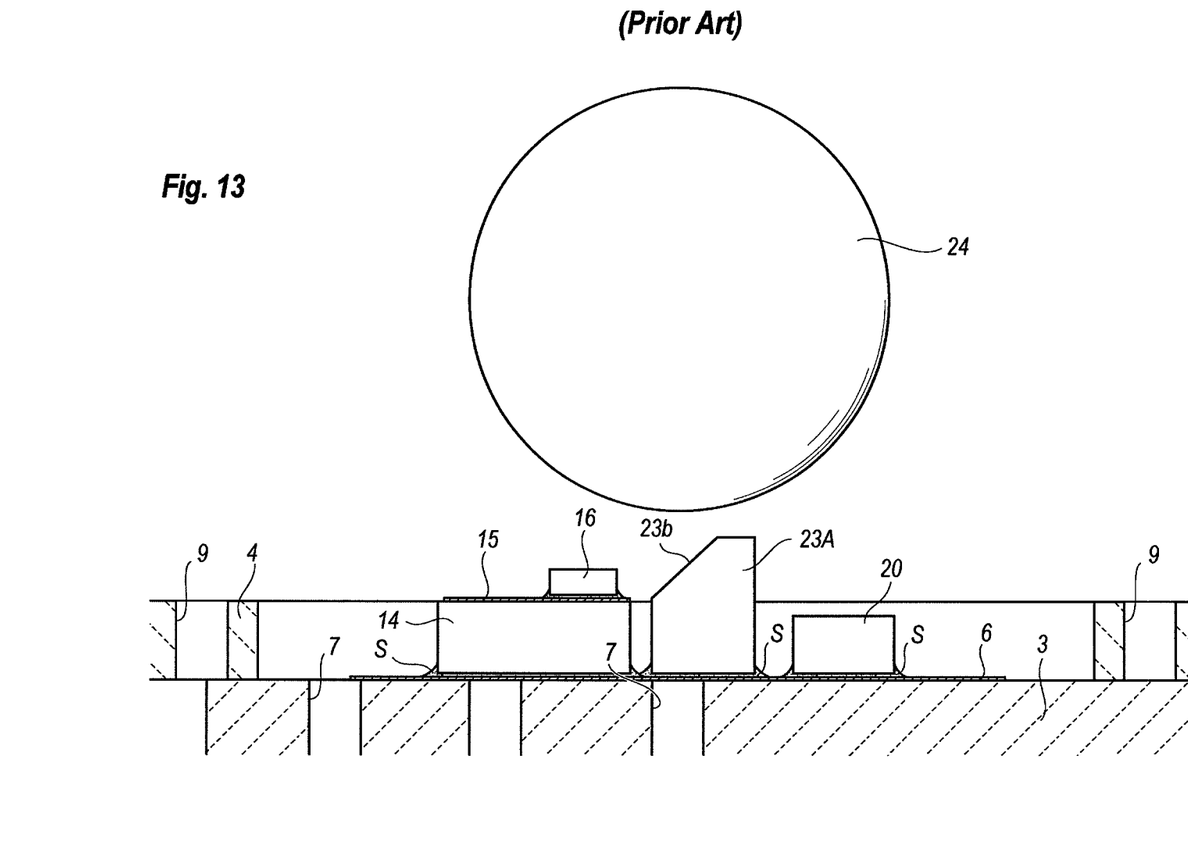
FIG. 13 magnifies the positional relation between the sub-mount, the LD and the optical component, which is shown in FIG. 13.

A coupling efficiency η between the LD 16 and the coupling fiber 33 is given by $P_f/P_0$, where $P_0$ is the optical power emitted from the LD 16, while, $P_f$ is that coupled with the coupling fiber 33, and it strongly depends on a distance L1 between the light emitting surface of the LD 16 and the lens 24. For instance, the coupling efficiency η makes a maximum at a position and decreases as the distance increases as shown in FIG. 12. Accordingly, the optical component 23 is necessary to be arranged with respect to the LD 16 precisely, typically within ±0.1 mm or less.

When there is no room to collect an excess adhesive, the optical component 23A is necessary to be placed on the metal layer 6 apart from the edge of the sub-mount 14 because the excess adhesive S forms fillets in the side of the sub-mount 14. In this case, the distance between the light emitting surface of the LD 16 and the light reflecting surface 23b is necessary to be measured exactly to secure the optical coupling efficiency η between the 16 LD and the coupling fiber 33, which inevitably makes the assembling process of the optical component 23 complex and requests a costly apparatus.

The present optical module 1 provides the optical component 23 with the chamfer 23d between the side surface 23a and the bottom thereof to collect the adhesive S oozed out from the bottom thereof, which makes it possible for the optical component 23 to abut against the front surface 14a of the sub-mount 14 and eliminates the process to measure the distance between the sub-mount 14 and the optical component 23. An appropriate distance between the LD 16 and the optical component 23 may be determined only by positioning the LD 16 on the top surface of the sub-mount 14 relatively and by abutting the sub-mount 14 against the optical component 23.

Figure 14:
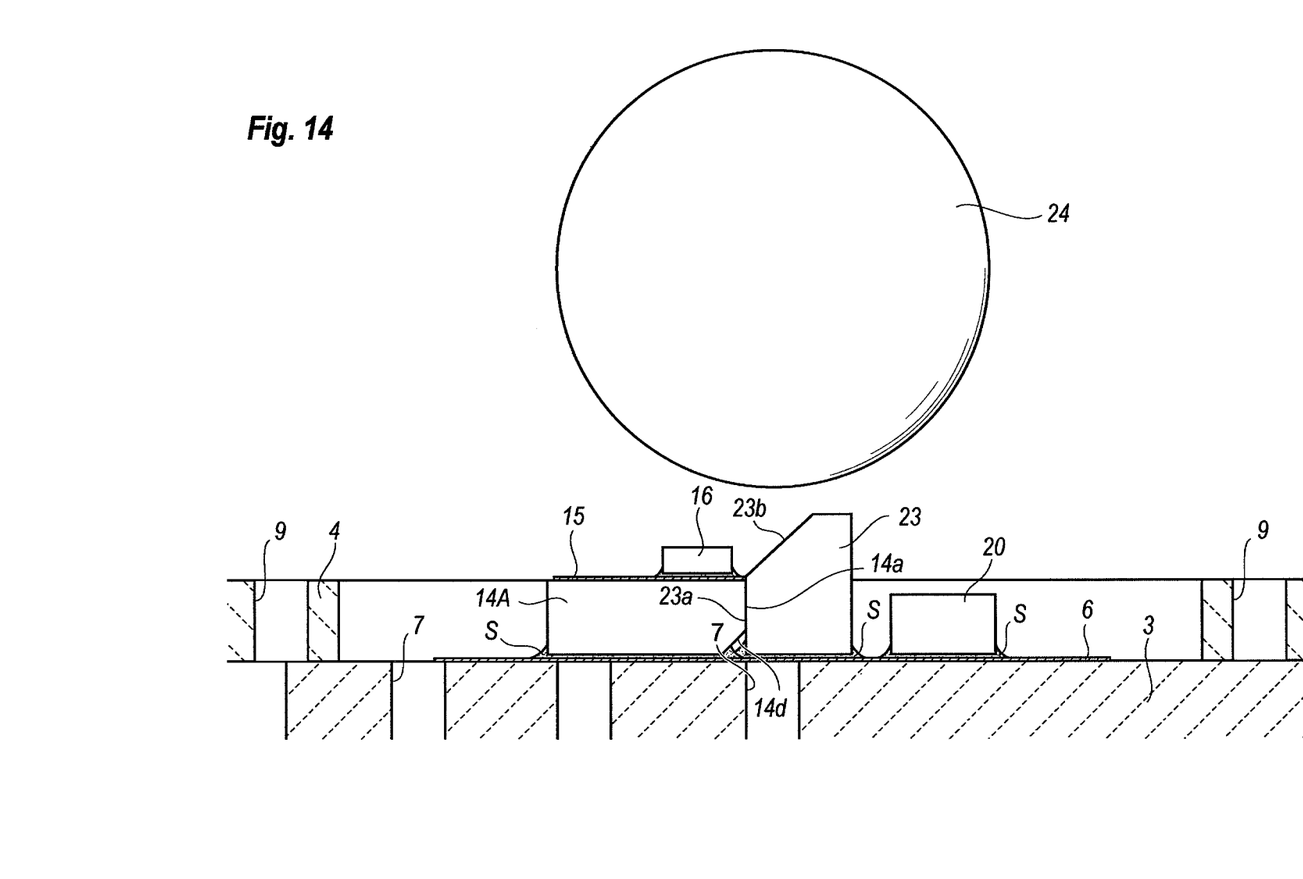
FIG. 14 is a side cross section of the optical module with a modified arrangement of the sub-mount.

Although the present invention has been fully described in conjunction with the preferred embodiment thereof with reference to the accompanying drawings, it is to be understood that various changes and modifications may be apparent to those skilled in the art. For instance, the embodiment thus described provides the optical component 23 with the chamfer 23d between the side surface 23a and the bottom thereof. However, the sub-mount 14A may provide a chamber 14d between the front surface 14a and the bottom thereof. In this case, the chamfer 14d may provide a room to receive fillets formed in the front surface 14a of the sub-mount 14 or in the side surface 23a of the optical component 23, as shown in FIG. 14; and the optical component 23 may be arranged as abutting the side surface 23a against the front surface 14a of the sub-mount 14. Moreover, both the sub-mount 14 and the optical component 23 may provide chamfer, 23d and 14d, in surfaces abutting against the others. Such changes and modifications are to be understood as included within the scope of the present invention as defined by the appended claims, unless they depart therefrom.

What is claimed is:

1. An optical module, comprising:
  a semiconductor optical device providing an optical axis;
  a sub-mount that mounts said semiconductor optical device thereon, said sub-mount providing a front surface;
  an optical component including a light-reflecting surface and a side surface that faces said front surface of said sub-mount; and
  a package including a surface that mounts said sub-mount and said optical component thereon, wherein said optical axis of said semiconductor optical device is substantially in parallel to said surface and said light-reflecting surface of said optical component bends said optical axis toward a direction substantially perpendicular to said surface of said package,
  wherein said front surface of said sub-mount comes in contact with said side surface of said optical component, and wherein said optical component has a chamfer between said side surface and a bottom surface in contact with said surface of said package.

2. The optical module of claim 1,
  wherein said chamfer provides a room to receive a surplus adhesive oozed out from an interface between said bottom surface of said optical component and said surface of said package.

3. The optical module of claim 1,
  wherein said light-reflecting surface makes a substantially half right angle with respect to said surface of said package.

4. The optical module of claim 1,
  further comprising a lens provided above said optical component, wherein said lens passes light reflected by said reflecting surface of said optical component.

5. A method for assembling an optical module that comprises a semiconductor optical device that provides an optical axis, a sub-mount that mounts said semiconductor optical device thereon and has a front surface, an optical component that includes a light-reflecting surface and a side surface that faces said front surface of said sub-mount, and a package that provides a surface for mounting said sub-mount and said optical component thereon, said method comprising steps of:
  handling said sub-mount with a vacuum collet;
  abutting said sub-mount against a reference wall of an apparatus providing said collet and placing said sub-mount in a predetermined position on said surface, wherein said predetermined position is defined with respect to said reference wall in said apparatus;
  handling said semiconductor optical device with said vacuum collet;
  abutting said semiconductor optical device against said reference wall and placing said semiconductor optical device in a designed position on said sub-mount; and
  placing said optical component on said surface of said package such that said side surface comes in contact with said front surface of said sub-mount.

6. A method for assembling an optical module that comprises a semiconductor optical device including an optical axis; a sub-mount for mounting said semiconductor optical device thereon, said sub-mount including a front surface; an optical component including a light-reflecting surface and a side surface that faces said front surface of said sub-mount; and a package that provides a surface for mounting said sub-mount and said optical component thereon, said method comprising steps of:
  placing said optical component in a predetermined position on said surface of said package;
  placing said sub-mount on said surface of said package such that said front surface of said sub-mount comes in contact with said side surface of said optical component;
  handling said semiconductor optical device by a vacuum collet;
  abutting said semiconductor optical device against a reference wall of an apparatus that provides said vacuum collet, wherein said package is aligned with said reference wall; and
  placing said semiconductor optical device in a predetermined position on said sub-mount.

7. An optical module, comprising:

a semiconductor optical device providing an optical axis;

a sub-mount that mounts said semiconductor optical device thereon, said sub-mount providing a front surface;

an optical component including a light-reflecting surface and a side surface that faces said front surface of said sub-mount; and a package including a surface that mounts said sub-mount and said optical component thereon, wherein said optical axis of said semiconductor optical device is substantially in parallel to said surface and said light-reflecting surface of said optical component bends said optical axis toward a direction substantially perpendicular to said surface of said package, wherein said front surface of said sub-mount comes in contact with said side surface of said optical component, and said sub-mount has a chamfer between said front surface and a bottom surface in contact with said surface of said package.

8. The optical module of claim 7, wherein said chamfer provides a room to receive a surplus adhesive oozed out from an interface between said bottom surface of said sub-mount and said surface of said package.

9. The optical module of claim 7, wherein said light-reflecting surface makes a substantially half right angle with respect to said surface of said package.

10. The optical module of claim 7, further comprising a lens provided above said optical component, wherein said lens passes light reflected by said reflecting surface of said optical component.

* * * * *